US012063693B2

(12) United States Patent
Wu

(10) Patent No.: US 12,063,693 B2
(45) Date of Patent: Aug. 13, 2024

(54) METHOD AND TERMINAL FOR TRANSMITTING RANDOM ACCESS REQUEST INFORMATION OR TARGET INFORMATION BASED ON PRIORITY

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 295 days.

(21) Appl. No.: 17/381,273

(22) Filed: Jul. 21, 2021

(65) Prior Publication Data

US 2021/0352739 A1    Nov. 11, 2021

Related U.S. Application Data

(63) Continuation of application No. PCT/CN2020/073530, filed on Jan. 21, 2020.

(30) Foreign Application Priority Data

Jan. 25, 2019  (CN) .................. 201910075820.X

(51) Int. Cl.
*H04W 74/0836* (2024.01)
*H04W 72/1263* (2023.01)
(Continued)

(52) U.S. Cl.
CPC ... *H04W 74/0841* (2013.01); *H04W 72/1263* (2013.01); *H04W 72/566* (2023.01); *H04W 74/002* (2013.01)

(58) Field of Classification Search
CPC ......... H04W 74/0841; H04W 72/1263; H04W 72/566; H04W 74/002; H04W 72/1268;
(Continued)

(56) References Cited

U.S. PATENT DOCUMENTS

2010/0098010 A1*  4/2010  Kuo .................. H04L 1/1887
                                                                370/329
2013/0195048 A1*  8/2013  Ekpenyong ....... H04W 74/0833
                                                                370/329
(Continued)

FOREIGN PATENT DOCUMENTS

CN    101489254 A1    7/2009
CN    103024923 A     4/2013
(Continued)

OTHER PUBLICATIONS

Institute for Information Industry, "Intra-UE prioritization and multiplexing between URLLC and eMBB," 3GPP TSG-RAN WG2 Meeting#104, R2-1816987, Spokane, USA, Nov. 12-16, 2018, pp. 1-3 (Year: 2018).*
(Continued)

*Primary Examiner* — Un C Cho
*Assistant Examiner* — Lalita W Pace
(74) *Attorney, Agent, or Firm* — Price Heneveld, LLP

(57) ABSTRACT

This disclosure provides an information transmission method and a terminal. The information transmission method according to the embodiments of this disclosure includes: in a case that transmission of random access request information conflicts with transmission of target information, transmitting the random access request information or the target information based on transmission priority.

18 Claims, 2 Drawing Sheets

(51) Int. Cl.
*H04W 72/566* (2023.01)
*H04W 74/00* (2009.01)
*H04W 74/0833* (2024.01)

(58) Field of Classification Search
CPC ........... H04W 72/569; H04W 74/0833; H04W 74/004; H04W 74/0875; H04W 74/0836; H04W 74/0838
See application file for complete search history.

(56) References Cited

U.S. PATENT DOCUMENTS

| | | | | |
|---|---|---|---|---|
| 2014/0079002 | A1* | 3/2014 | Chen | H04W 72/21 370/329 |
| 2015/0181624 | A1* | 6/2015 | Hwang | H04W 74/002 370/329 |
| 2018/0324854 | A1* | 11/2018 | Phuyal | H04W 74/0833 |
| 2019/0349061 | A1* | 11/2019 | Cirik | H04L 1/1861 |
| 2020/0146071 | A1* | 5/2020 | Yerramalli | H04W 76/11 |

FOREIGN PATENT DOCUMENTS

| | | |
|---|---|---|
| CN | 110475372 A | 11/2019 |
| CN | 110636532 A | 12/2019 |
| CN | 110858998 A | 3/2020 |
| WO | 2018175809 A1 | 9/2019 |
| WO | WO-2020026355 A1 * | 2/2020 |

OTHER PUBLICATIONS

CATT, "Msg3 grant overlapping with another UL grant," 3GPP TSG-RAN WG2 #104, R2-1816354, Spokane, U.S.A, Nov. 12-Nov. 16, 2018, pp. 1-3 (Year: 2018).*

Media Tek Inc., Discussion and decision; On Channel Access Procedure; 3GPP TSG RAN WG1 Ad Hoc Meeting 1901; Taipei, Taiwan, Jan. 21-25, 2019; 7 pages.

VIVO; Interaction between MAC and PHY for intra-UE prioritization; Discussion and Decision; 3GPP TSC-RAN WG2 Meeting #4; Spokane, USA, Nov. 12-156, 2018; 6 pages.

Mediatek Inc., "On parallel SR and RACH procedure in NR", 3GPP TSG-RAN WG2 Meeting #101 Bis, R2-1806164, Sanya, China, Apr. 16-20, 2018.

* cited by examiner

Network device

Terminal

METHOD AND TERMINAL FOR TRANSMITTING RANDOM ACCESS REQUEST INFORMATION OR TARGET INFORMATION BASED ON PRIORITY

CROSS-REFERENCE TO RELATED APPLICATIONS

This application is a continuation application of International Application No. PCT/CN2020/073530 filed on Jan. 21, 2020, which claims priority to Chinese Patent Application No. 201910075820.X filed in China on Jan. 25, 2019, both disclosures of which are incorporated herein by reference in their entireties.

TECHNICAL FIELD

This disclosure relates to the field of communications technologies, and in particular, to an information transmission method and a terminal.

BACKGROUND

For the new two-step random access procedure, a network side first configures configuration information of new two-step random access for user equipment (UE), for example, including information of transmission resources corresponding to random access request information and random access acknowledgment information; next, a terminal triggers a new two-step random access procedure, and sends a random access request message including data information and control information to the network side, for example, sending the data information through a physical uplink shared channel (PUSCH), and possibly also sending the control information to the network side through a physical random access channel (PRACH); and then, the network side sends random access acknowledgment information to the UE, and if the UE fails to receive the random access acknowledgment information, the UE sends another random access request message.

However, when a transmission resource configured for random access request information of a new two-step random access procedure conflicts with other transmission resources, the UE is unable to determine how information is to be transmitted.

SUMMARY

According to a first aspect, an embodiment of this disclosure provides an information transmission method, including:
  in a case that transmission of random access request information conflicts with transmission of target information, transmitting the random access request information or the target information based on transmission priority.

According to a second aspect, an embodiment of this disclosure further provides a terminal, including:
  a transmission module, configured to, in a case that transmission of random access request information conflicts with transmission of target information, transmit the random access request information or the target information based on transmission priority.

According to a third aspect, an embodiment of this disclosure further provides a terminal, including a memory, a processor, and a computer program stored in the memory and capable of running on the processor, where when the computer program is executed by the processor, the steps of the foregoing information transmission method are implemented.

According to a fourth aspect, an embodiment of this disclosure further provides a computer-readable storage medium, where the computer-readable storage medium stores a computer program, and when the computer program is executed by a processor, the steps of the foregoing information transmission method are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings.

DESCRIPTION OF EMBODIMENTS

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances, so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 1:
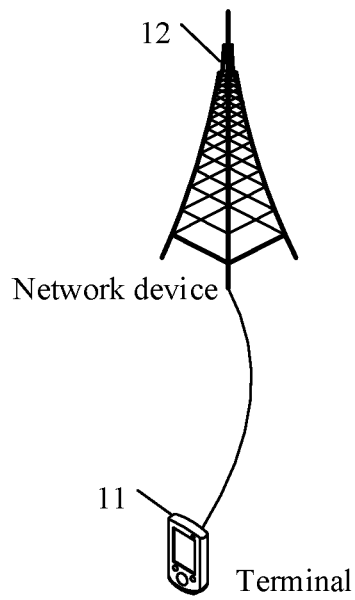
FIG. 1 is a block diagram of a mobile communications system to which an embodiment of this disclosure may be applied.

FIG. 1 is a block diagram of a wireless communications system to which an embodiment of this disclosure may be applied. The wireless communications system includes a terminal 11 and a network device 12. The terminal 11 may also be referred to as a terminal device or user equipment (UE). The terminal 11 may be a terminal side device such as a mobile phone, a tablet personal computer, a laptop computer, a personal digital assistant (PDA), a mobile interne device (MID), a wearable device, or an in-vehicle device. It should be noted that the specific type of the terminal 11 is not limited in the embodiments of this disclosure. The network device 12 may be a base station or a core network, where the base station may be a base station of 5G or a later release (for example, gNB or 5G NR NB), or base stations in other communications systems (for example, eNB, WLAN access point, or other access points). The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, or some other appropriate terms in the art. As long as the same technical effect is achieved, the base station is not limited to a specific technical term. It should be noted that only the base station in the NR system is used as an example in the embodiments of this disclosure, which does not limit the specific type of the base station though.

Figure 2:
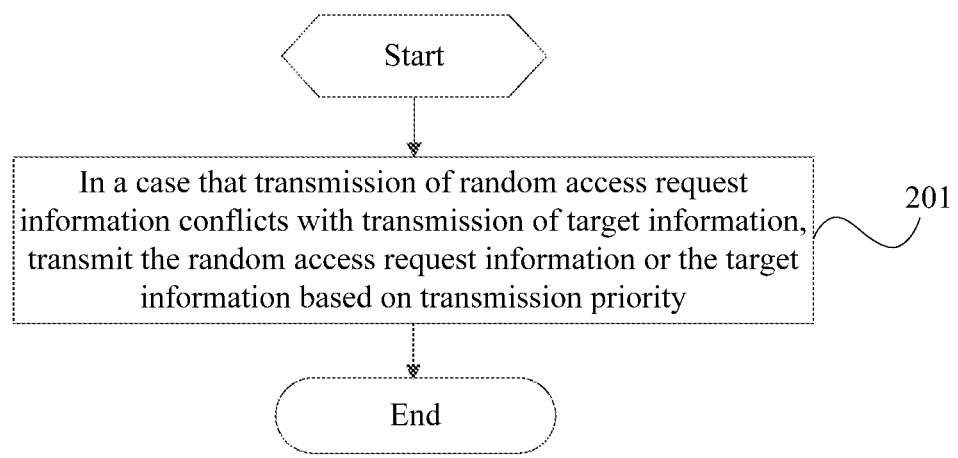
FIG. 2 is a schematic flowchart of an information transmission method according to an embodiment of this disclosure.

As shown in FIG. 2, an embodiment of this disclosure provides an information transmission method, applied to a terminal and including the following step:

Step 201. In a case that transmission of random access request information conflicts with transmission of target information, transmit the random access request information or the target information based on transmission priority.

The transmission priority is configured by a network side or prescribed by a protocol. Specifically, in a random access procedure, when transmission of random access request information conflicts with transmission of target information, the terminal selects to transmit information with a higher transmission priority based on transmission priority. The random access procedure refers to a new two-step random access procedure.

The random access request information includes at least one of the following:
 data information in the random access request information or control information in the random access request information.

The target information may be information other than the random access request information, for example, information corresponding to an uplink grant transmission which is dynamically scheduled by network, preset data information, preset control information, and the like.

The conflict between transmission of the random access request information and transmission of the target information includes a conflict between transmission of the random access request information and transmission of the target information in at least one of time domain, frequency domain, space domain, or power domain.

For example, a first transmission resource for the random access request information conflicts with a second transmission resource for the target information in at least one of time domain, frequency domain, or space domain.

Alternatively, a first transmission power for the random access request information conflicts with a second transmission power for the target information.

A conflict in time domain herein may mean a total or partial overlap of transmission time.

A conflict in frequency domain may mean a total or partial overlap of transmission frequency range, or transmissions on a same cell or a same bandwidth part.

A conflict in space domain may mean that transmissions correspond to reference signals with a same identifier, or transmissions correspond to reference signals that partially or totally overlap in time-frequency domain.

A conflict in power domain may mean that a sum of transmission power for MsgA and transmission power for the target information exceeds maximum power allowed by UE.

The first transmission resource for the random access request information is a resource configured by a network device for the terminal for sending random access request messages. In an embodiment of this disclosure, before the terminal performs new two-step random access, the network device configures for the terminal transmission resource configuration information for MsgA in the new two-step random access procedure.

The "transmission resource configuration information for MsgA" includes transmission resource configuration information for the data information, for example, uplink grant information (UL grant) for transmission of MsgA PUSCH. This uplink grant information includes at least one of time domain resource information, frequency domain resource information, or spatial resource information for the PUSCH transmission.

The time domain resource information may include transmission subframes (or slots) and periodicity; the frequency domain resource information may include physical resource block (PRB) allocation; and the spatial resource information may include corresponding reference signal identifiers, for example, synchronization signal block (SSB) and channel state information reference signal (CSI-RS).

Additionally, the "transmission resource configuration information for MsgA" may further include transmission resource configuration information for the control information, for example, resource information for transmission of MsgA PRACH. The resource information for PRACH transmission includes at least one of time-frequency resource information, code domain resource information, or spatial domain resource information for PRACH.

The time-frequency resource information for PRACH may refer to random access channel occasions (PRACH Occasion, PO), the code domain resource information for PRACH may include a preamble, and the spatial domain resource information for PRACH includes corresponding reference signal identifiers, for example, SSB and CSI-RS.

In the information transmission method according to the embodiments of this disclosure, in a case that transmission of random access request information conflicts with transmission of target information, the random access request information or the target information is transmitted based on transmission priority. In the embodiments of this disclosure, in the case that transmission of the random access request information conflicts with transmission of the target information, information with a higher transmission priority is transmitted first, thereby ensuring reliable transmission of the information with a higher priority.

Further, the step 201 includes:
 in a case that transmission of the data information in the
  random access request information conflicts with transmission of the target information, if a transmission priority of the target information is higher than that of the data information, transmitting the target information; or in a case that transmission of the data information in the random access request information conflicts with transmission of the target information, if a transmission priority of the target information is lower than that of the data information, transmitting the data information.

In the information transmission method according to this embodiment of this disclosure, in a case that transmission of data information in the random access request information conflicts with transmission of the target information, the information with a higher transmission priority is transmitted based on transmission priority, thereby ensuring reliable transmission of the information with a higher priority.

"Conflict" herein means that the terminal cannot perform simultaneous transmissions or the UE cannot use multiple resources at the same time. For example, transmission of MsgA PUSCH cannot be performed in a same cell at the same time as transmission of PRACH. For another example, the UE has both a UL grant for MsgA and a UL grant for network scheduling on a cell 1, and the UE can only use one of the UL grants at a time.

Further, in the case that transmission of the data information in the random access request information conflicts with transmission of the target information, if the transmission priority of the target information is higher than that of the data information, transmission of the control information in the random access request information is abandoned.

In this embodiment of this disclosure, if it is determined, based on the transmission priority, that the terminal is not to transmit data information of MsgA, for example, not to transmit a PUSCH of MsgA, which is specifically that the terminal discards the UL grant corresponding to the PUSCH of MsgA, the terminal abandons transmission of the control information of MsgA, for example, abandoning transmission of the PRACH of MsgA.

Further, the step 201 includes:
in a case that transmission of the control information in the random access request information conflicts with transmission of the target information, if a transmission priority of the target information is higher than that of the control information, transmitting the target information; or
in a case that transmission of the control information in the random access request information conflicts with transmission of the target information, if a transmission priority of the target information is lower than that of the control information, transmitting the control information.

In the information transmission method according to this embodiment of this disclosure, in a case that transmission of the control information in the random access request information conflicts with transmission of the target information, information with a higher transmission priority is transmitted based on transmission priority, thereby ensuring reliable transmission of the information with a higher priority.

"Conflict" means that the UE cannot perform simultaneous transmissions. For example, transmission of MsgA PRACH cannot be performed in a same cell at the same time as transmission of PUSCH. For another example, maximum transmission power of the UE is limited, making it impossible for the UE to transmit a MsgA PRACH on a PCell and transmit a PRACH on a primary secondary cell (PSCell) at the same time.

Further, in the case that transmission of the control information in the random access request information conflicts with transmission of the target information, if a transmission priority of the target information is higher than that of the control information, transmission of the data information in the random access request information is abandoned.

In this embodiment of this disclosure, in the case that transmission of the control information in the random access request information conflicts with transmission of the target information, if the terminal determines, based on the transmission priority, not to transmit the control information of MsgA, for example, not to transmit the PRACH of MsgA, the terminal also abandons transmission of the data information of MsgA, for example, abandoning transmission of the PUSCH of MsgA.

In addition, in this embodiment of this disclosure, in a case that transmission of the data information in the random access request information conflicts with transmission of first target information, and transmission of the control information in the random access request information conflicts with transmission of second target information, the data information or the first target information is transmitted and the control information or the second target information is transmitted, based on the transmission priority.

For example, if a transmission priority of the data information is higher than that of the first target information and a transmission priority of the control information is higher than that of the second target information, the data information and the control information are transmitted.

For another example, if a transmission priority of the data information is lower than that of the first target information and a transmission priority of the control information is lower than that of the second target information, the first target information and the second target information are transmitted.

For still another example, if a transmission priority of the data information is higher than that of the first target information and a transmission priority of the control information is lower than that of the second target information, the first target information and the second target information are transmitted; or if a transmission priority of the data information is lower than that of the first target information and a transmission priority of the control information is higher than that of the second target information, the first target information and the second target information are transmitted.

Further, in this embodiment of this disclosure, when a transmission priority of the target information is higher than that of the random access request information:
the random access request information includes data information, and the target information is one of the following information:
information corresponding to an uplink grant transmission which is dynamically scheduled by network;
information corresponding to an uplink grant transmission which is dynamically scheduled by network, where the uplink grant transmission which is dynamically scheduled by network is used for data retransmission;
retransmission information;
data information of a service preset with a high priority;
control information preset with a high priority;
preset data information; or
preset control information.

Further, when a transmission priority of the target information is higher than that of the random access request information:
the random access request information includes control information, and the target information is one of the following information:
retransmission information;
data information of a service preset with a high priority;
control information preset with a high priority;
preset data information; or
preset control information.

In a specific embodiment of this disclosure, the following may be preconfigured by the network side or prescribed by a protocol:
when a transmission resource for MsgA data information conflicts with an uplink grant for dynamic network scheduling (or an uplink grant for semi-persistent network configuration), for example, an UL grant for a PUSCH of MsgA of the UE and an UL grant for DCI scheduling are simultaneously on a PCell (Primary cell), the UE preferentially uses the uplink grant for dynamic network scheduling (or the uplink grant for semi-persistent network configuration) for transmission; or
when a transmission resource for MsgA data information conflicts with an uplink grant for dynamic network scheduling (or an uplink grant for semi-persistent network configuration), the UE preferentially uses the transmission resource for MsgA data information for transmission; or
when a transmission resource for MsgA data information conflicts with an uplink grant for dynamic network scheduling (or an uplink grant for semi-persistent network configuration), if the uplink grant for dynamic network scheduling is used for data retransmission (for example, HARQ retransmission), the UE preferentially uses the uplink grant for dynamic network scheduling (or the uplink grant for semi-persistent network configuration) for transmission; or
when a transmission resource for MsgA data information conflicts with an uplink grant for dynamic network scheduling (or an uplink grant for semi-persistent network configuration), if the transmission resource for MsgA data information is used for data retransmission (for example, retransmission of the MsgA data information), the UE preferentially uses the transmission resource for MsgA data information for transmission; or
when a transmission resource for MsgA data information conflicts with an uplink grant for dynamic network scheduling (or an uplink grant for semi-persistent network configuration), if a new two-step random access procedure is triggered by a high priority trigger condition, the UE preferentially uses the transmission resource for MsgA data information for transmission; or
when transmission of MsgA data information conflicts with transmission of other data information (for example, the UE triggers transmission of MsgA PUSCH on a PCell while having transmission of other data information on an SCell, and the UE is unable to transmit PUSCHs simultaneously on the PCell and the SCell due to limited capability (such as power)), the UE gives priority to the transmission of MsgA data information; or when transmission of MsgA data information conflicts with transmission of other data information, the UE gives priority to the transmission of other data information; or
when transmission of MsgA data information conflicts with transmission of other data information, the UE gives priority to data retransmission (for example, HARQ retransmission); or
when transmission of MsgA data information conflicts with transmission of other data information, the UE gives priority to transmission of data information of a service preset with a high priority; or
when transmission of MsgA data information conflicts with transmission of other data information, if a new two-step random access procedure is triggered by a high priority trigger condition, the UE preferentially uses a transmission resource for MsgA data information for transmission; or
when transmission of MsgA data information conflicts with transmission of other control information (for example, the UE triggers transmission of MsgA PUSCH on a PCell while having PUCCH transmission on an SCell, and the UE is unable to simultaneously transmit the PUSCH on the PCell and transmit the PUCCH on the SCell due to limited capability (such as power)), the UE gives priority to the transmission of MsgA data information; or
when transmission of MsgA data information conflicts with transmission of other control information, the UE gives priority to the transmission of other control information; or
when transmission of MsgA data information conflicts with transmission of other control information, the UE gives priority to a retransmission of MsgA data (for example, HARQ retransmission); or
when transmission of MsgA data information conflicts with transmission of other control information, the UE gives priority to transmission of data information of a service preset with a high priority; or
when transmission of MsgA data information conflicts with transmission of other control information, the UE gives priority to transmission of control information preset with a high priority; or
when transmission of MsgA data information conflicts with transmission of other control information, if a new two-step random access procedure is triggered by a preset high priority trigger condition, the UE preferentially uses a transmission resource for MsgA data information for transmission.

Further, when a transmission priority of the target information is lower than that of the random access request information:
the random access request information includes data information, and the target information is information corresponding to an uplink grant transmission which is dynamically scheduled by network; or
in a case that the random access request information includes data information, and the target information is information corresponding to an uplink grant transmission which is dynamically scheduled by network, a random access procedure is triggered by a preset high priority trigger condition or the data information is retransmission information; or
the random access request information includes data information, and the target information is preset data information; or the random access request information includes data information, and the target information is preset control information; or in a case that the random access request information includes data information, and the target information is preset data information or preset control information, the data information is retransmission information, or a random access procedure is triggered by a preset high priority trigger condition or the data information is data information of a service preset with a high priority.

Further, when a transmission priority of the target information is lower than that of the random access request information:

the random access request information includes control information in the random access request information, and the target information is preset data information; or in a case that the random access request information includes control information in the random access request information, and the target information is preset data information or preset control information, a random access procedure is triggered by a preset high priority trigger condition or the control information is control information preset with a high priority.

In a specific embodiment of this disclosure, the following may be preconfigured by the network side or prescribed by a protocol:

when transmission of MsgA control information conflicts with transmission of other data information (for example, the UE triggers transmission of MsgA PRACH on a PCell while also having transmission of other data information on the PCell, and the UE is unable to transmit the PUSCH and the PRACH simultaneously on the PCell due to limited capability), the UE gives priority to the transmission of MsgA control information; or when transmission of MsgA control information conflicts with transmission of other data information, the UE gives priority to the transmission of other data information; or when transmission of MsgA control information conflicts with transmission of other data information, the UE gives priority to data retransmission (for example, the transmission of other data information is HARQ retransmission); or when MsgA control information conflicts with transmission of other data information, the UE gives priority to transmission of data information of a service preset with a high priority; or when transmission of MsgA control information conflicts with transmission of other control information, if a new two-step random access procedure is triggered by a high priority trigger condition, the UE preferentially uses a transmission resource for MsgA data information for transmission; or when transmission of MsgA control information conflicts with transmission of other control information (for example, the UE triggers transmission of MsgA PRACH on a PCell while having PUCCH transmission on an SCell, and the UE is unable to simultaneously transmit the PRACH on the PCell and transmit the PUCCH on the SCell due to limited capability (such as power)), the UE gives priority to the transmission of MsgA control information; or when transmission of MsgA control information conflicts with transmission of other control information control information, the UE gives priority to transmission of other control information; or when transmission of MsgA control information conflicts with transmission of other control information, the UE gives priority to transmission of control information with a high priority; or when transmission of MsgA control information conflicts with transmission of other control information, if a new two-step random access procedure is triggered by a high priority trigger condition, the UE preferentially uses a transmission resource for MsgA control information for transmission.

The preset data information may be other data information than the MsgA data information, and the preset control information may be other control information than the MsgA control information.

The data information of a service preset with a high priority includes at least one of the following:

data of a predetermined logical channel or data of predetermined control signaling.

For example, the data of a predetermined logical channel is data from logical channel 1, and the data of predetermined control signaling is a power headroom report (PHR) MAC control element (CE).

The control information preset with a high priority includes at least one of the following:

channel quality feedback information preset with a high priority or control information corresponding to data transmission preset with a high priority.

For example, the channel quality feedback information preset with a high priority is channel quality feedback information with a high priority configured by the network, and the control information corresponding to data transmission preset with a high priority is HARQ feedback information corresponding to data transmission of logical channel 1, or a scheduling request (SR) or PRACH triggered by data of logical channel 1.

The preset high priority trigger condition includes at least one of the following:

a random access procedure triggered by initial access, for example, random access initiated by the terminal in a radio resource control idle state (RRC_IDLE);

a random access procedure triggered by a connection re-establishment, for example, an RRC connection re-establishment triggered by a radio link failure of the terminal;

a random access procedure triggered by handover, for example, the network side sending a handover command to hand over the terminal from cell 1 to cell 2;

a random access procedure triggered in a case that downlink data arrives and the terminal is out of synchronization in uplink, for example, when data of a service with a high priority arrives and the terminal is out of synchronization in uplink;

a random access procedure triggered in a case that uplink data arrives and the terminal is out of synchronization in uplink, for example, when data of a service with a high priority arrives and the terminal is out of synchronization in uplink;

a random access procedure triggered by state transition, for example, when the terminal enters a connected state from a radio resource control inactive (RRC_INACTIVE) state;

a random access procedure triggered by an uplink timing advance TA for establishing uplink synchronization for a secondary cell SCell, for example, when SCell1 of the UE has separate uplink synchronization timing, and the network side triggers the UE to initiate a random access procedure to obtain TA of this SCell;

a random access procedure triggered by a system information request, for example, when the terminal requests the network side to send SIBS; or a random access procedure triggered by beam failure recovery.

In the information transmission method of the embodiments of this disclosure, when the transmission resource for MsgA configured for the new two-step random access conflicts with other transmission resources, data or control information with a higher priority can be transmitted first, thereby ensuring reliable transmission of the information with a higher priority.

Figure 3:
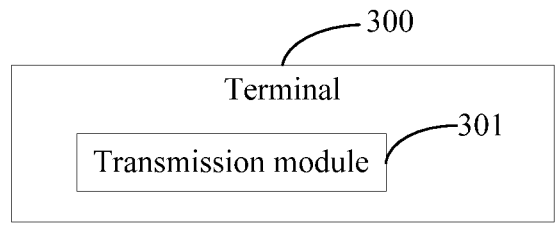
FIG. 3 is a schematic modular structural diagram of a terminal according to an embodiment of this disclosure.

FIG. 3 is a schematic modular diagram of a terminal according to an embodiment of this disclosure. As shown in FIG. 3, an embodiment of this disclosure further provides a terminal 300, including:

a transmission module 301, configured to, in a case that transmission of random access request information conflicts with transmission of target information, transmit the random access request information or the target information based on transmission priority.

For the terminal of this embodiment of this disclosure, the random access request information includes at least one of the following:

data information in the random access request information or control information in the random access request information.

For the terminal of this embodiment of this disclosure, the transmission module 301 is configured to, in a case that transmission of the data information in the random access request information conflicts with transmission of the target information, if a transmission priority of the target information is higher than that of the data information, transmit the target information; or configured to, in a case that transmission of the data information in the random access request information conflicts with transmission of the target information, if a transmission priority of the target information is lower than that of the data information, transmit the data information.

For the terminal of this embodiment of this disclosure, the transmission module 301 is further configured to, in a case that transmission of the data information in the random access request information conflicts with transmission of the target information, if a transmission priority of the target information is higher than that of the data information, abandon transmission of the control information in the random access request information.

For the terminal of this embodiment of this disclosure, the transmission module 301 is configured to, in a case that transmission of the control information in the random access request information conflicts with transmission of the target information, if a transmission priority of the target information is higher than that of the control information, transmit the target information; or configured to, in a case that transmission of the control information in the random access request information conflicts with transmission of the target information, if a transmission priority of the target information is lower than that of the control information, transmit the control information.

For the terminal of this embodiment of this disclosure, the transmission module 301 is further configured to, in a case that transmission of the control information in the random access request information conflicts with transmission of the target information, if a transmission priority of the target information is higher than that of the control information, abandon transmission of the data information in the random access request information.

For the terminal of this embodiment of this disclosure, when a transmission priority of the target information is higher than that of the random access request information:

the random access request information includes data information, and the target information is one of the following information:

information corresponding to an uplink grant transmission which is dynamically scheduled by network;

information corresponding to an uplink grant transmission which is dynamically scheduled by network, where the uplink grant transmission which is dynamically scheduled by network is used for data retransmission;

retransmission information;

data information of a service preset with a high priority;

control information preset with a high priority;

preset data information; or preset control information.

For the terminal of this embodiment of this disclosure, when a transmission priority of the target information is higher than that of the random access request information:

the random access request information includes control information, and the target information is one of the following information:

retransmission information;

data information of a service preset with a high priority;

control information preset with a high priority;

preset data information; or preset control information.

For the terminal of this embodiment of this disclosure, when a transmission priority of the target information is lower than that of the random access request information:

the random access request information includes data information, and the target information is information corresponding to an uplink grant transmission which is dynamically scheduled by network; or in a case that the random access request information includes data information, and the target information is information corresponding to an uplink grant transmission which is dynamically scheduled by network, a random access procedure is triggered by a preset high priority trigger condition or the data information is retransmission information; or the random access request information includes data information, and the target information is preset data information; or the random access request information includes data information, and the target information is preset control information; or in a case that the random access request information includes data information, and the target information is preset data information or preset control information, the data information is retransmission information, or a random access procedure is triggered by a preset high priority trigger condition, or the data information is data information of a service preset with a high priority.

For the terminal of this embodiment of this disclosure, when a transmission priority of the target information is lower than that of the random access request information:

the random access request information includes control information in the random access request information, and the target information is preset data information; or in a case that the random access request information includes control information in the random access request information, and the target information is preset data information or preset control information, a random access procedure is triggered by a preset high priority trigger condition or the control information is control information preset with a high priority.

For the terminal of this embodiment of this disclosure, the data information of a service preset with a high priority includes at least one of the following:
   data of a predetermined logical channel or data of predetermined control signaling.

For the terminal of this embodiment of this disclosure, the control information preset with a high priority includes at least one of the following:
   channel quality feedback information preset with a high priority or control information corresponding to data transmission preset with a high priority.

For the terminal of this embodiment of this disclosure, the preset high priority trigger condition includes at least one of the following:
   a random access procedure triggered by initial access;
   a random access procedure triggered by a connection re-establishment;
   a random access procedure triggered by handover;
   a random access procedure triggered in a case that downlink data arrives and a terminal is out of synchronization in uplink;
   a random access procedure triggered in a case that uplink data arrives and a terminal is out of synchronization in uplink;
   a random access procedure triggered by state transition;
   a random access procedure triggered by an uplink timing advance TA for establishing uplink synchronization for a secondary cell SCell;
   a random access procedure triggered by a system information request; or
   a random access procedure triggered by beam failure recovery.

The terminal according to this embodiment of this disclosure, in a case that transmission of random access request information conflicts with transmission of target information, transmits the random access request information or the target information based on transmission priority. In the embodiments of this disclosure, in the case that transmission of the random access request information conflicts with transmission of the target information, information with a higher transmission priority is transmitted first, thereby ensuring reliable transmission of the information with a higher priority.

Figure 4:
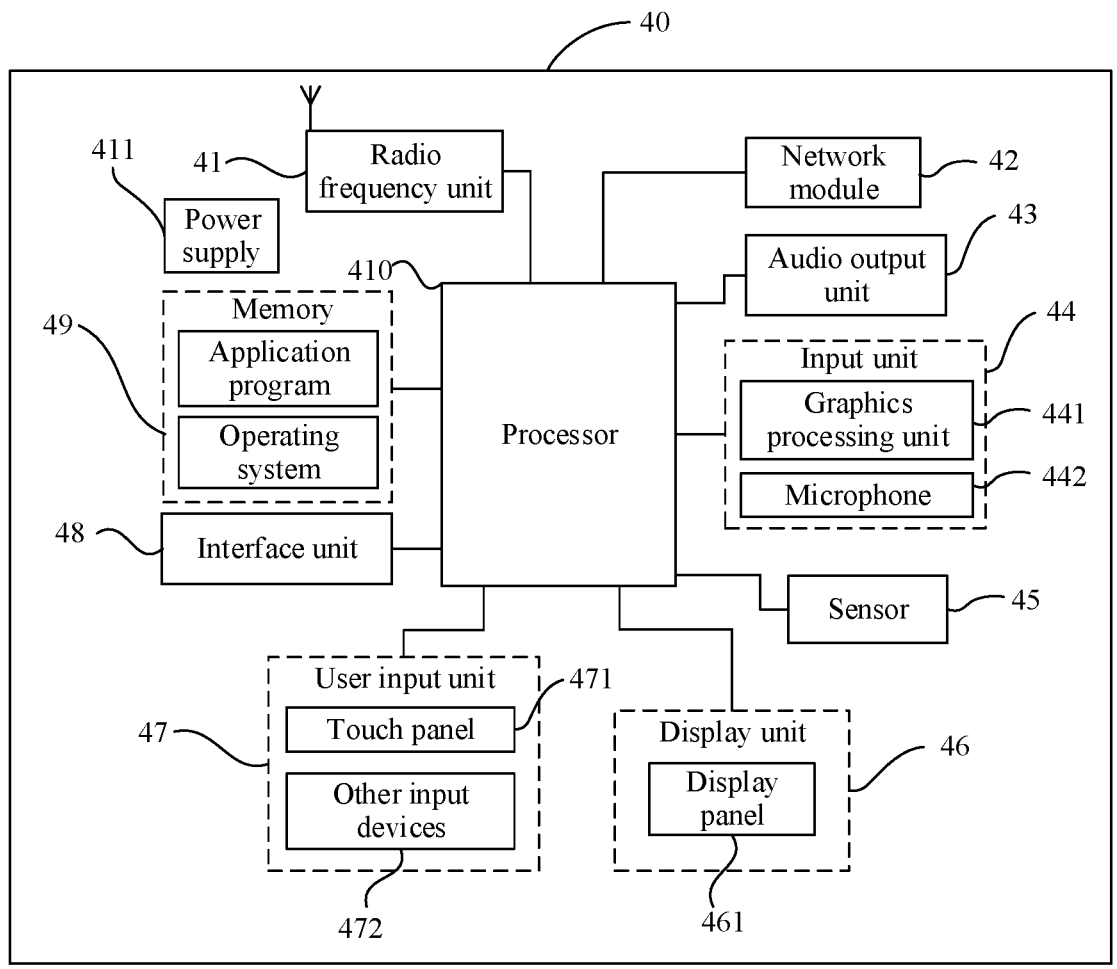
FIG. 4 is a structural block diagram of a terminal according to an embodiment of this disclosure.

To better achieve the foregoing objective, further, FIG. 4 is a schematic diagram of a hardware structure of a terminal for implementing the embodiments of this disclosure. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that the structure of the terminal shown in FIG. 4 does not constitute a limitation on the terminal. The terminal may include more or fewer components than those shown in the figure, or combine some components, or have different component arrangements. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 41 is configured to receive and transmit data under control of the processor 410.

The processor 410 is configured to, in a case that transmission of random access request information conflicts with transmission of target information, transmit the random access request information or the target information based on transmission priority.

The terminal according to this embodiment of this disclosure, in a case that transmission of random access request information conflicts with transmission of target information, transmits the random access request information or the target information based on transmission priority. In the embodiments of this disclosure, in the case that transmission of the random access request information conflicts with transmission of the target information, information with a higher transmission priority is transmitted first, thereby ensuring reliable transmission of the information with a higher priority.

It should be understood that, in this embodiment of this disclosure, the radio frequency unit 41 may be configured to transmit or receive a signal in an information transmitting/receiving or call process. Specifically, the radio frequency unit 41 receives downlink data from a base station and transmits the downlink data to the processor 410 for processing; and transmits uplink data to the base station. Typically, the radio frequency unit 41 includes but is not limited to an antenna, at least one amplifier, a transceiver, a coupler, a low noise amplifier, a duplexer, and the like. In addition, the radio frequency unit 41 may further communicate with a network and other devices through a wireless communications system.

The terminal provides wireless broadband Internet access for a user by using the network module 42, for example, helping the user send and receive e-mails, browse web pages, and access streaming media.

The audio output unit 43 may convert audio data received by the radio frequency unit 41 or the network module 42 or stored in the memory 49 into an audio signal and output the audio signal as a sound. In addition, the audio output unit 43 may further provide audio output (for example, a call signal reception tone or a message reception tone) that is related to a specific function performed by the terminal 40. The audio output unit 43 includes a loudspeaker, a buzzer, a phone receiver, and the like.

The input unit 44 is configured to receive an audio signal or a video signal. The input unit 44 may include a graphics processing unit (GPU) 441 and a microphone 442. The graphics processing unit 441 processes image data of a static picture or a video that is obtained by an image capture apparatus (for example, a camera) in a video capture mode or an image capture mode. A processed image frame may be displayed on the display unit 46. An image frame processed by the graphics processing unit 441 may be stored in the memory 49 (or another storage medium) or sent by the radio frequency unit 41 or the network module 42. The microphone 442 can receive a sound and can process the sound into audio data. The processed audio data can be converted, in a telephone call mode, into a format that can be sent to a mobile communication base station through the radio frequency unit 41 and output as such.

The terminal 40 further includes at least one sensor 45, for example, an optical sensor, a motion sensor, and other sensors. Specifically, the optical sensor includes an ambient light sensor and a proximity sensor. The ambient light sensor may adjust brightness of a display panel 461 based on intensity of ambient light. When the terminal 40 moves near an ear, the proximity sensor may disable the display panel 461 and/or backlight. As a motion sensor, an accelerometer sensor may detect magnitudes of accelerations in various directions (typically three axes), may detect the magnitude and direction of gravity when the terminal is still, and may be configured for recognition of terminal postures (for example, landscape/portrait mode switching, related gaming, or magnetometer posture calibration), and functions related to vibration recognition (for example, pedometer and tapping), and the like. The sensor 45 may further include a fingerprint sensor, a pressure sensor, an iris sensor, a molecular sensor, a gyroscope, a barometer, a hygrometer, a thermometer, or an infrared sensor. Details are not described herein.

The display unit 46 is configured to display information input by the user or information provided to the user. The display unit 46 may include the display panel 461. The display panel 461 may be configured in a form of a liquid crystal display (LCD), an organic light-emitting diode (OLED), or the like.

The user input unit 47 may be configured to receive input digit or character information, and generate key signal input related to user setting and function control of the terminal. Specifically, the user input unit 47 includes a touch panel 471 and other input devices 472. The touch panel 471, also referred to as a touchscreen, may capture a touch operation performed by a user on or near the touch panel (for example, an operation performed by the user on the touch panel 471 or near the touch panel 471 by using any appropriate object or accessory such as a finger or a stylus). The touch panel 471 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, transmits the touch point coordinates to the processor 410, and receives and executes a command transmitted by the processor 410. In addition, the touch panel 471 may be implemented in a plurality of forms, for example, as a resistive, capacitive, infrared, or surface acoustic wave touch panel. In addition to the touch panel 471, the user input unit 47 may further include other input devices 472. Specifically, the other input devices 472 may include but are not limited to a physical keyboard, a function key (for example, a volume control key or a power on/off key), a track ball, a mouse, and a joystick. Details are not described herein.

Further, the touch panel 471 may cover the display panel 461. After detecting a touch operation on or near the touch panel 471, the touch panel 471 transmits the touch operation to the processor 410 for determining a type of the touch event. Then the processor 410 provides corresponding visual output on the display panel 461 based on the type of the touch event. Although the touch panel 471 and the display panel 461 are used as two separate components to implement input and output functions of the terminal in FIG. 4, the touch panel 471 and the display panel 461 may be integrated to implement the input and output functions of the terminal in some embodiments. This is not specifically limited herein.

The interface unit 48 is an interface for connecting an external apparatus to the terminal 40. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 48 may be configured to receive input (for example, data information and electric power) from the external apparatus, and transmit the received input to one or more elements in the terminal 40; or may be configured to transmit data between the terminal 40 and the external apparatus.

The memory 49 may be configured to store software programs and various types of data. The memory 49 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 49 may include a high-speed random access memory, or may include a nonvolatile memory, for example, at least one magnetic disk storage device, a flash memory device, or other volatile solid-state storage devices.

The processor 410 is a control center of the terminal, which connects various parts of the terminal by using various interfaces and lines, and executes various functions of the terminal and processes data by running or executing software programs and/or modules stored in the memory 49 and invoking data stored in the memory 49, so as to perform overall monitoring on the terminal. The processor 410 may include one or more processing units. Optionally, the processor 410 may integrate an application processor and a modem processor. The application processor mainly processes an operating system, a user interface, an application program, and the like.

The modem processor mainly processes wireless communication. It may be understood that the modem processor may alternatively not be integrated into the processor 410.

The terminal 40 may further include the power supply 411 (for example, a battery) that supplies power to the components. Optionally, the power supply 411 may be logically connected to the processor 410 through a power management system, so as to implement functions such as charging management, discharging management, and power consumption management by using the power management system.

In addition, the terminal 40 includes some functional modules that are not shown. Details are not described herein.

Optionally, an embodiment of this disclosure further provides a terminal, including a processor 410, a memory 49, and a computer program stored in the memory 49 and capable of running on the processor 410. When the computer program is executed by the processor 410, the processes of the foregoing information transmission method embodiments are implemented, and a same technical effect can be achieved. To avoid repetition, details are not described herein again. The terminal may be a wireless terminal or a wired terminal. The wireless terminal may be a device providing a user with voice and/or other service data connectivity, a handheld device having a wireless connection function, or other processing devices connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, a portable, pocket-sized, handheld, computer built-in, or in-vehicle mobile apparatus, which exchanges voice and/or data with the radio access network. For example, it may be a device such as a personal communication service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, or a user device (or User Equipment). This is not limited herein.

An embodiment of this disclosure further provides a computer-readable storage medium, where the computer-readable storage medium stores a computer program. When the computer program is executed by a processor, the processes of the foregoing information transmission method embodiment are implemented, with the same technical effect achieved. To avoid repetition, details are not described herein again. For example, the computer-readable storage medium is a read-only memory (ROM), a random access memory (RAM), a magnetic disk, or an optical disc.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections via some interfaces, apparatuses or units, and may be implemented in electrical, mechanical, or other forms.

The units described as separate parts may or may not be physically separate, and parts displayed as units may or may not be physical units and may be located in one position or distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as a separate product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed sequentially in the order of description, but are not necessarily performed in such order, and some steps may be performed in parallel or separate from each other. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, the objectives of this disclosure may also be achieved by running a program or a group of programs on any computing apparatus. The computing apparatus may be a general apparatus of common sense. Therefore, the objective of this disclosure may also be achieved by merely providing a program product including program code for implementing the method or apparatus. To be specific, the program product also constitutes part of this disclosure, and a storage medium storing the program product also constitutes part of this disclosure. Apparently, the storage medium may be any storage medium of common sense or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed sequentially in the order of description, but are not necessarily performed in such order. Some steps may be performed in parallel or separate from each other.

The foregoing descriptions are merely optional implementations of this disclosure. It should be noted that a person of ordinary skill in the art may make several improvements or polishing without departing from the principle of this disclosure and such improvements and polishing shall fall within the protection scope of this disclosure.

What is claimed is:

1. An information transmission method, comprising: in a case that transmission of MsgA in a two-step random access procedure conflicts with transmission of target information, transmitting the MsgA or the target information based on transmission priority;
   wherein the MsgA comprises a physical uplink shared channel (PUSCH) of the MsgA;
   in a case that transmission of the PUSCH of the MsgA conflicts with transmission of the target information, a transmission priority of the target information is higher than that of the PUSCH of the MsgA, and the transmitting the MsgA or the target information based on transmission priority, comprises: transmitting the target information; or
   in a case that transmission of the PUSCH of the MsgA conflicts with transmission of the target information, a transmission priority of the target information is lower than that of the PUSCH of the MsgA, and the transmitting the MsgA or the target information based on transmission priority, comprises: transmitting the PUSCH of the MsgA.

2. The information transmission method according to claim 1, wherein the MsgA further comprises control information of the MsgA.

3. The information transmission method according to claim 2, further comprising: in a case that transmission of the PUSCH of the MsgA conflicts with transmission of the target information, if the transmission priority of the target information is higher than that of the PUSCH of the MsgA, abandoning transmission of the control information of the MsgA.

4. The information transmission method according to claim 2, wherein the transmitting the MsgA or the target information based on transmission priority comprises:
in a case that transmission of the control information of the MsgA conflicts with transmission of the target information, if a transmission priority of the target information is higher than that of the control information, transmitting the target information; or
in a case that transmission of the control information of the MsgA conflicts with transmission of the target information, if a transmission priority of the target information is lower than that of the control information, transmitting the control information.

5. The information transmission method according to claim 4, further comprising:
in the case that transmission of the control information of the MsgA conflicts with transmission of the target information, if the transmission priority of the target information is higher than that of the control information, abandoning transmission of the PUSCH of the MsgA.

6. The information transmission method according to claim 1, wherein when a transmission priority of the target information is higher than that of the MsgA:
the target information is one of the following information:
information corresponding to an uplink grant transmission which is dynamically scheduled by network;
information corresponding to an uplink grant transmission which is dynamically scheduled by network, wherein the uplink grant transmission which is dynamically scheduled by network is used for data retransmission;
retransmission information;
data information of a service preset with a high priority;
control information preset with a high priority;
preset data information; or
preset control information.

7. The information transmission method according to claim 1, wherein when a transmission priority of the target information is higher than that of the MsgA:
the MsgA further comprises control information, and the target information is one of the following information:
retransmission information;
data information of a service preset with a high priority;
control information preset with a high priority;
preset data information; or
preset control information.

8. The information transmission method according to claim 1, wherein when a transmission priority of the target information is lower than that of the MsgA:

the target information is information corresponding to an uplink grant transmission which is dynamically scheduled by network; or
in a case that the target information is information corresponding to an uplink grant transmission which is dynamically scheduled by network, a random access procedure is triggered by a preset high priority trigger condition or the PUSCH of the MsgA is retransmission information; or
the target information is preset data information; or
the target information is preset control information; or
in a case that the target information is preset data information or preset control information, the PUSCH of the MsgA is retransmission information, or a random access procedure is triggered by a preset high priority trigger condition, or the PUSCH of the MsgA is data information of a service preset with a high priority.

9. The information transmission method according to claim 1, wherein when a transmission priority of the target information is lower than that of the MsgA:
the MsgA further comprises control information of the MsgA, and the target information is preset data information; or
in a case that the MsgA comprises control information of the MsgA, and the target information is preset data information or preset control information, a random access procedure is triggered by a preset high priority trigger condition or the control information is control information preset with a high priority.

10. The information transmission method according to claim 6, wherein the data information of a service preset with a high priority comprises at least one of the following:
data of a predetermined logical channel or data of predetermined control signaling.

11. The information transmission method according to claim 6, wherein the control information preset with a high priority comprises at least one of the following:
channel quality feedback information preset with a high priority or control information corresponding to data transmission preset with a high priority.

12. The information transmission method according to claim 9, wherein the preset high priority trigger condition comprises at least one of the following:
a random access procedure triggered by initial access;
a random access procedure triggered by a connection re-establishment;
a random access procedure triggered by handover;
a random access procedure triggered in a case that downlink data arrives and a terminal is out of synchronization in uplink;
a random access procedure triggered in a case that uplink data arrives and a terminal is out of synchronization in uplink;
a random access procedure triggered by state transition;
a random access procedure triggered by an uplink timing advance (TA) for establishing uplink synchronization for a secondary cell (SCell);
a random access procedure triggered by a system information request; or
a random access procedure triggered by beam failure recovery.

13. A terminal, comprising a memory, a processor, and a computer program stored in the memory and capable of running on the processor, wherein the computer program is executed by the processor to implement:
in a case that transmission of MsgA in a two-step random access procedure conflicts with transmission of target information, transmitting the MsgA or the target information based on transmission priority;

wherein the MsgA includes a physical uplink shared channel (PUSCH) of the MsgA;

in a case that transmission of the PUSCH of the MsgA conflicts with transmission of the target information, a transmission priority of the target information is higher than that of the PUSCH of the MsgA, and the transmitting the MsgA or the target information based on transmission priority, comprises: transmitting the target information; or in a case that transmission of the PUSCH of the MsgA conflicts with transmission of the target information, a transmission priority of the target information is lower than that of the PUSCH of the MsgA, and the transmitting the MsgA or the target information based on transmission priority, comprises: transmitting the PUSCH of the MsgA.

14. The terminal according to claim 13, wherein the MsgA further comprises:

control information of the MsgA.

15. The terminal according to claim 14, wherein the computer program is further executed by the processor to implement: in a case that transmission of the PUSCH of the MsgA conflicts with transmission of the target information, if a transmission priority of the target information is higher than that of the PUSCH of the MsgA, abandoning transmission of the control information of MsgA.

16. The terminal according to claim 14, wherein the computer program is further executed by the processor to implement: in a case that transmission of the control information of the MsgA conflicts with transmission of the target information, if a transmission priority of the target information is higher than that of the control information, transmitting the target information; or in a case that transmission of the control information of the MsgA conflicts with transmission of the target information, if a transmission priority of the target information is lower than that of the control information, transmitting the control information.

17. The terminal according to claim 16, wherein the computer program is further executed by the processor to implement: in a case that transmission of the control information of the MsgA conflicts with transmission of the target information, if a transmission priority of the target information is higher than that of the control information, abandoning transmission of the PUSCH of the MsgA.

18. A non-transitory computer-readable storage medium, wherein the non-transitory computer-readable storage medium stores a computer program, and the computer program is executed by a processor to implement:

in a case that transmission of MsgA in a two-step random access procedure conflicts with transmission of target information, transmitting the MsgA or the target information based on transmission priority;

wherein the MsgA comprises a physical uplink shared channel (PUSCH) of the MsgA;

in a case that transmission of the PUSCH of the MsgA conflicts with transmission of the target information, a transmission priority of the target information is higher than that of the PUSCH of the MsgA, and the transmitting the MsgA or the target information based on transmission priority, comprises: transmitting the target information; or in a case that transmission of the PUSCH of the MsgA conflicts with transmission of the target information, a transmission priority of the target information is lower than that of the PUSCH of the MsgA, and the transmitting the MsgA or the target information based on transmission priority, comprises: transmitting the PUSCH of the MsgA.

* * * * *